UNITED STATES PATENT OFFICE.

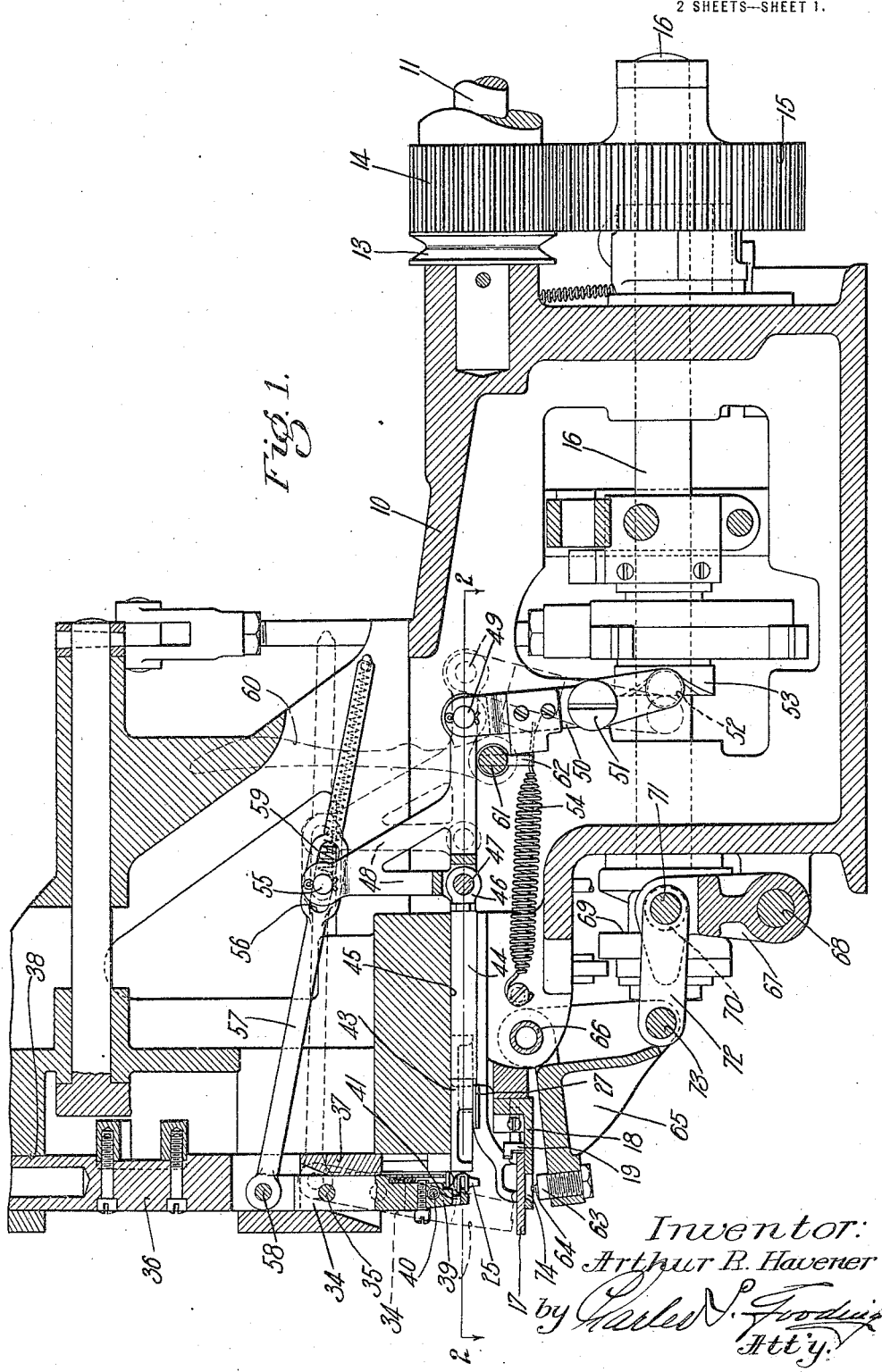

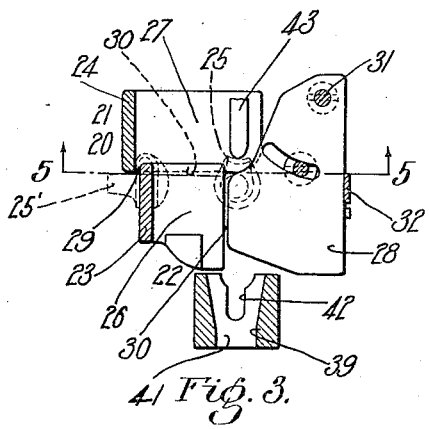
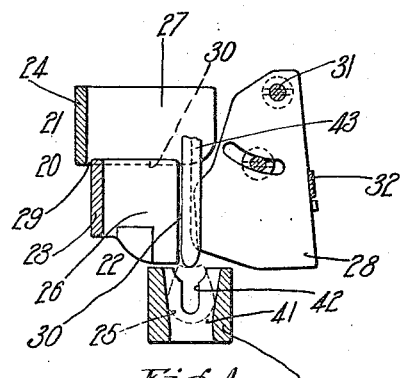
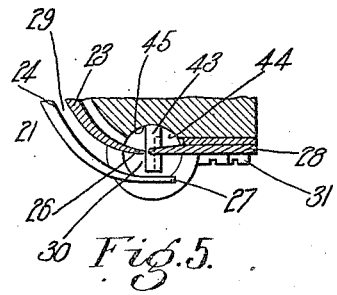
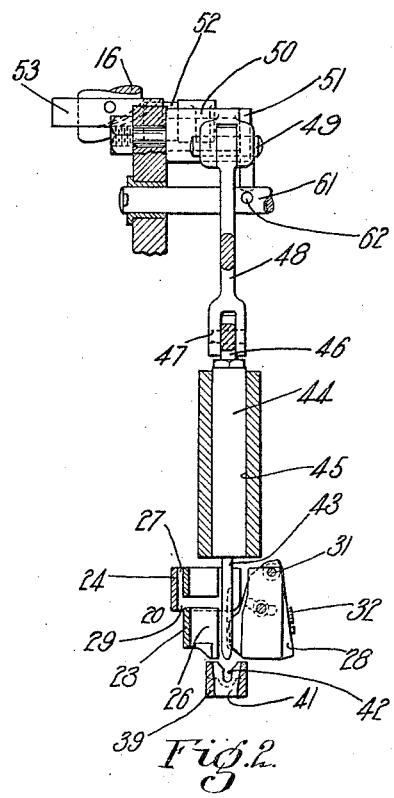
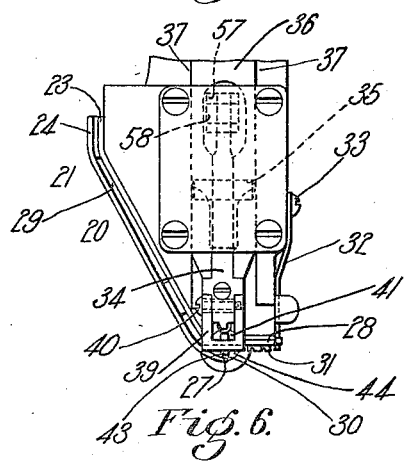

ARTHUR R. HAVENER, OF WALTHAM, MASSACHUSETTS, ASSIGNOR TO AMERICAN LACING HOOK CO., A CORPORATION OF NEW JERSEY.

FEEDING DEVICE FOR LACING-HOOK-SETTING MACHINES.

1,182,479. Specification of Letters Patent. Patented May 9, 1916.

Original application filed May 29, 1914, Serial No. 841,932. Divided and this application filed September 4, 1915. Serial No. 49,035.

*To all whom it may concern:*

Be it known that I, ARTHUR R. HAVENER, a citizen of the United States, residing at Waltham, in the county of Middlesex and State of Massachusetts, have invented new and useful Improvements in Feeding Devices for Lacing-Hook-Setting Machines, of which the following is a specification.

This invention relates to improvements in feeding devices for lacing hook setting machines, said feeding device being particularly adapted for use in connection with the lacing hook setting machine embodied in my copending application Ser. No. 841,932, filed May 29, 1914. The subject matter of this application is divided out of said copending application of which it forms a part as originally filed.

The object of the invention is to provide simple and efficient means for conducting lacing hooks from a suitable hopper to the lacing hook carrier of the machine.

Another object of the invention is to provide a construction whereby all of the lacing hooks on the raceway along which said hooks are conducted to the carrier may be quickly emptied therefrom when desired.

The invention consists in the combination and arrangement of parts set forth in the following specification and particularly pointed out in the claims thereof.

Referring to the drawings: Figure 1 is a vertical sectional elevation of a lacing hook setting machine with a hook feeding device embodying my invention shown in connection therewith. Fig. 2 is a section, partly in elevation, taken on the line 2—2 of Fig. 1. Fig. 3 is a section taken substantially along the line 2—2 of Fig. 1 illustrating the parts in the positions which they would occupy just previous to the transferring of a hook from the raceway to the hook carrier. Fig. 4 is a section similar to Fig. 3 illustrating the parts in the positions which they would occupy immediately after a hook has been transferred to said carrier. Fig. 5 is a section taken on the line 5—5 of Fig. 3. Fig. 6 is a front elevation of the lower portion of the head of the machine illustrating the hook carrier and raceway for conducting lacing hooks to said carrier.

Like numerals refer to like parts throughout the several views of the drawings.

In the drawings, 10 is the frame of the machine, 11 a stationary shaft upon which is journaled a pulley 13 and a pinion 14. Said pinion meshes into a gear 15 which is constructed and arranged to impart a rotary motion to a cam shaft 16 from which the several operating parts of the machine receive their motion. The upper 17 of a shoe into which the lacing hooks are to be driven is placed upon a work support 18, fastened to the frame of the machine, with the edge of said upper resting against the edge gage 19, also fastened to the frame of the machine, see Fig. 1. The lacing hooks which are to be set in said upper are contained in a hopper of any suitable construction, not shown in the drawings, and are conducted by a raceway 20 downwardly from said hopper to be set in the upper.

The raceway 20 consists of a vertically disposed portion 21 and a horizontally disposed portion 22. The vertically disposed portion 21 consists of two guide plates 23 and 24. The plate 23 projects into the neck of the lacing hook 25, while the portion 24 rests against the shank of the lacing hook, see Fig. 3. At their lower ends the parts 23 and 24 of the raceway are bent to form horizontally disposed portions 26 and 27 of said raceway.

The horizontally disposed portion 22 of the raceway 20 consists, as a whole, of the portions 26 and 27 and a movable portion 28. The vertically disposed portion of the raceway 20 has a race slot 29 and the horizontally disposed portion 22 of said raceway has a race slot 30 and these two slots are at right angles to each other. The movable portion 28 is pivoted at 31 to the frame of the machine and is held normally in the position illustrated in Fig. 3 by a flat spring 32, the upper end of which is pivoted at 33 to the frame of the machine and the lower end of which bears against the outer edge of the pivoted movable portion 28 of the raceway, see Figs. 3, 4 and 6.

A lacing hook carrier 34 is pivoted at 35 to a vertical slide 36 guided in ways 37 and 38 in the frame of the machine. The lower part of said carrier is formed of a U-shaped pocket 39 fastened by a screw 40 to the body portion of said carrier and said pocket has a chamber 41 therein adapted to receive a lacing hook, the lower edge of said pocket having a slot 42 therein into which the neck of the lacing hook enters, when the same is fed on to the carrier by a feed finger 43 which is fast to a slide 44 and forms a part thereof. Said slide 44 is adapted to slide in ways 45 formed in the frame of the machine and at its rear end is provided with an eye 46 through which a pivotal pin 47 extends connecting said slide with a rocker frame 48. Said rocker frame is connected by a pin 49 with a cam lever 50 which is pivoted at 51 to the frame of the machine and has journaled upon its lower end a cam roll 52. The roll 52 engages a cam 53 which is fastened to the cam shaft 16. A spring 54 holds the cam roll 52 in engagement with said cam.

The upper end of the rocker frame 48 has a pin 55 therein which projects through a slot 56 provided in a link 57 and said link is connected at its forward end by a pin 58 to the upper end of the lacing hook carrier 34. The link 57 is extended rearwardly beyond the rocker frame 48 and has fastened to its rearward end one end of a spring 59, the other end of said spring being fastened to the pin 55. The spring 59 is constantly under tension and thus tends to at all times push the link 57 toward the front end of the machine and to hold the lacing hook carrier 34 in the vertical position, illustrated in Fig. 1, in which position said lacing hook carrier stands when the lacing hook is driven.

The feed finger 43 may be moved rearwardly and simultaneously the lacing hook carrier 34 may be tipped upon its pivot to move the lower end thereof forwardly or away from said feed finger by a hand lever 60, shown in dotted lines Fig. 1, which hand lever is fastened to a rock shaft 61 pivoted on the frame of the machine and said rock shaft has a downwardly projecting arm 62 thereon arranged to engage the lever 50. The hand lever 60 may be manually operated when desired to move the feed finger 43 rearwardly and simultaneously to rock the lacing hook carrier 34 so as to move the lower end thereof forwardly as, for example, when it is desired to take out a lacing hook which has been jammed, or if it is desired, to empty the lacing hooks from the raceway the hand lever 60 is moved forwardly, thus separating the feed finger and lacing hook carrier, and the spring 32 is moved upon its pivot 33 forwardly to disengage the rocker plate 28, which upon being swung out of its normal position or toward the right, Figs. 3 and 4, allows all of the lacing hooks on the raceway to slide down said raceway and out of the machine.

A vertical reciprocatory motion is imparted to the slide 36 and to the lacing hook carrier 34 thereon by any suitable instrumentalities and preferably in the manner illustrated in the copending application, hereinbefore referred to, and constituting no part of this invention. During said reciprocatory motion the shank of the lacing hook is clenched in the upper 17 by driving the same against an anvil 63, which has a feed point 64 thereon and is adjustably fastened to a rocker frame 65 by reason of having screw-threaded engagement therewith.

The rocker frame 65 is preferably fastened to a tubular shaft 66 which constitutes a pivot therefor and is slidably arranged in the frame of the machine. A rocking motion is imparted to the rocker frame 65 and to the shaft 66 by a lever 67 pivoted at 68 to the frame of the machine, to which lever a rocking motion is imparted by a cam 69 which engages a cam roll 70 journaled on a pin 71 fast to said cam lever 67. A link 72 is connected to the cam lever 67 by a pin 71 and its other end is connected by a pin 73 to the lower end of the rocker frame 65, said rocker frame being adapted to coöperate with the slide 36 to clench the hook within said upper.

The general operation of the mechanism hereinbefore specifically described is as follows: Assuming the parts to be in the position illustrated in Figs. 1 and 3, the machine is set into operation by means, not shown in the drawings, the upper 17 being placed in its proper position against the edge gage 19. Assuming now a lacing hook 25 is resting upon the bottom of the pocket 39, as shown in Fig. 1 in full lines and in Fig. 4 in dotted lines, the machine is so timed that the lacing hook carrier will commence its downward movement, being actuated by the slide 36 and the instrumentalities hereinbefore set forth. At the same time that the lacing hook carrier moves downwardly with its lacing hook to set the same in the upper 17, the anvil 63 is moved upwardly into a vertical position, with the feed point 64 projecting upwardly through a slot 74 in the work support 18. The lacing hook is driven through the upper and against the anvil 63 and is clenched in said upper in a manner well known to those skilled in the art, while the feed point 64 projects upwardly into the shank of the lacing hook. Having now set the lacing hook in the upper of a boot or shoe, the feed finger 43 is moved rearwardly by the rocker frame 48, cam lever 50 and cam 53 until the pin 55 bottoms in the slot 56 of the link 57. Upon further rearward movement the link 57 causes the lacing hook carrier 34 to be rocked upon its pivot 35, thus withdrawing the lower end of said lacing hook carrier from the lacing hook and throwing it into the position shown in dotted lines Fig. 1. The lacing hook now having been released from the lacing hook carrier is free to be moved to feed the upper the necessary distance to space the lacing hook. As soon as the lacing hook carrier 34 is freed from the lacing hook, as hereinbefore set forth, it is moved upwardly by the slide 36, and when it arrives at its highest point the rocker frame 48 is operated to move the feed finger 43 forwardly and the lacing hook carrier 34 is simultaneously moved toward said feed finger and into position to receive a lacing hook 25 which is pushed along the horizontally disposed portion 22 of the raceway 20 past the movable part 28 of said raceway and on to the plate at the lower end of the pocket 39. If it is desired to empty the lacing hooks from the raceway the spring 32 is moved forwardly out of engagement with the movable pivoted plate 28. Said plate is then thrown to the right Fig. 3 and the lacing hooks will all empty from the raceway down the space thus provided.

It will be understood that the lacing hooks in the vertically disposed portion 21 of the raceway 20 stand in a substantially horizontal position, as illustrated in dotted lines, by the lacing hook 25', Fig. 3. Then, as said lacing hook passes down on to the horizontally disposed portion of the raceway it assumes a vertical position, as shown in dotted lines, by the lacing hook 25, Fig. 3. It will be seen that when the lacing hook 25 has assumed the vertical position, the horizontal portion 27 of the part 21 still bears against the shank of the lacing hook and that the edge of the part 26 projects beneath the adjacent edge of the head of the lacing hook, while the part 28 projects beneath the opposite edge of the head of the lacing hook. Thus the lacing hook is suspended by its head upon the two parts 26 and 28 and is prevented from tipping over backward by the part 27. Then, when the feed finger 43 moves forward to feed the lacing hook 25 on to the lacing hook carrier it strikes the lacing hook 25 in the neck and as it pushes said lacing hook forward said lacing hook will be still suspended upon the parts 26 and 28, with said parts bearing against the opposite edges of the neck of said lacing hook, while the part 28 presses the neck of the lacing hook against the part 26 with a yielding pressure, due to the spring 32, and the neck of the lacing hook passes along in the race slot 30 until it passes out of said slot and out from between the plate 28 and the part 25 on to the lacing hook carrier.

Having thus described my invention what I claim and desire by Letters Patent to secure is:

1. A device for feeding a lacing hook having, in combination, a raceway terminating at its lower end in a horizontally disposed portion open at its delivery end and embodying two sides arranged to bear against the opposite edges of the neck of said lacing hook, one of said sides being movable relatively to the other and normally positioned to coöperate with said other side to form a stop whereby said movable side may be moved away from the opposite side of said raceway to a sufficient extent to allow said hook to drop off of said other side of said raceway.

2. A device of the class described having, in combination, a raceway terminating at its lower end in a horizontally disposed portion, having two sides, one of said sides being pivotally supported and movable relatively to the opposite side of said raceway and normally positioned to form a support arranged to bear against one edge of the neck of a lacing hook located on said horizontally disposed portion, said pivoted side being constructed and arranged to be rocked away from the opposite side of said raceway a sufficient distance to allow the lacing hooks on said raceway to be emptied therefrom.

3. A device of the class described having, in combination, a raceway terminating at its lower end in a horizontally disposed portion, having two sides, one of said sides being pivotally supported and movable relatively to the opposite side of said raceway and normally positioned to form a support arranged to bear against one edge of the neck of a lacing hook located on said horizontally disposed portion, a spring adapted to bear against said pivoted side and hold the same pressed toward the other of said sides, said pivoted side being constructed and arranged to be rocked away from the opposite side of said raceway a sufficient distance to allow the lacing hooks on said raceway to be emptied therefrom.

4. A device of the class described having, in combination, a raceway terminating at its lower end in a horizontally disposed portion, having two sides, one of said sides being movable relatively to the opposite side of said raceway and normally positioned to bear against one edge of the neck of a lacing hook located on said horizontally disposed portion of said raceway and constituting a stop for said lacing hook, a lacing hook carrier located at the outer end of said horizontally disposed portion of said raceway, a feed finger located at the inner end of said horizontally disposed portion and mechanism constructed and arranged to move said feed finger into engagement with said lacing hook located on said horizontally disposed portion with the opposite edges of the neck of said lacing hook bearing against the opposite sides, respectively, of said horizontally disposed portion of said raceway, whereby said lacing hook may be moved along said horizontally disposed portion and onto said carrier.

5. A device of the class described having, in combination, a raceway terminating at its lower end in a horizontally disposed portion, having two sides, one of said sides being pivotally supported and movable relatively to the opposite side thereof and normally positioned to constitute a stop for a lacing hook resting thereon, a lacing hook carrier located at the outer end of the race slot in said horizontally disposed portion of said raceway, a slide upon which said carrier is pivoted, a feed finger located at the inner end of said horizontally disposed portion, mechanism constructed and arranged to automatically push said lacing hook along said horizontally disposed portion of said raceway and onto said carrier, said mechanism arranged to subsequently rock said carrier on said slide out of engagement with said hook and manually operable means adapted to operate said mechanism to move said feed finger and said lacing hook in opposite directions and simultaneously away from the lower end of said raceway.

6. A device of the class described having, in combination, a raceway comprising a vertically disposed portion and a horizontally disposed portion having two sides, the race slot in said vertically disposed portion extending at an angle to the race slot in said horizontally disposed portion, one side of said horizontally disposed portion being movable relatively to the opposite side thereof and normally positioned to constitute a stop for a lacing hook located on said horizontally disposed portion and arranged to bear against one edge of the neck of said lacing hook located on said horizontally disposed portion, said movable portion being constructed and arranged to be moved away from said opposite side a sufficient distance to allow the lacing hooks on said raceway to be emptied therefrom.

In testimony whereof I have hereunto set my hand in presence of two subscribing witnesses.

ARTHUR R. HAVENER.

Witnesses:
CHARLES S. GOODING,
SYDNEY E. TAFT.

Copies of this patent may be obtained for five cents each, by addressing the "Commissioner of Patents Washington, D. C."